E. SACHS.
BALL BEARING WITH BALL RETAINING DEVICE.
APPLICATION FILED JUNE 29, 1912.
1,147,685.
Patented July 20, 1915.
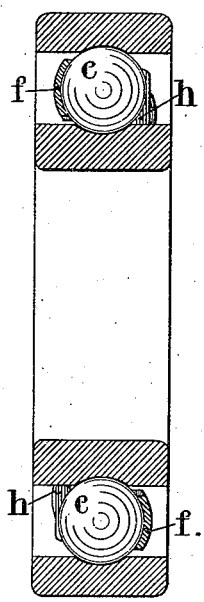
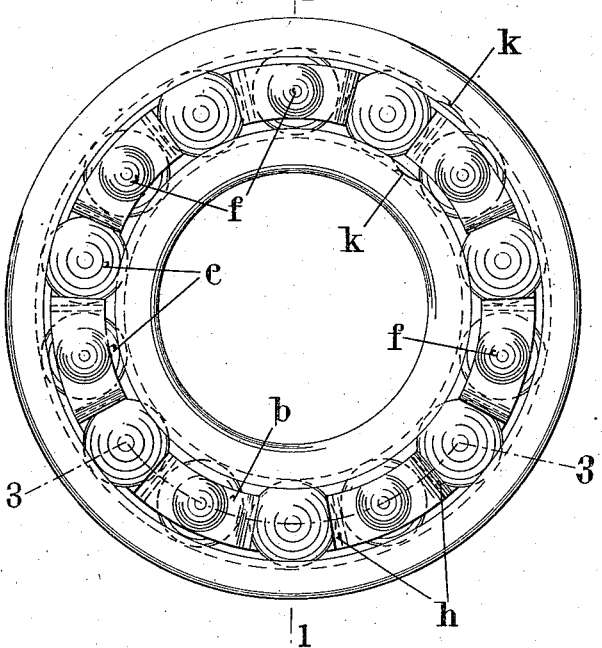
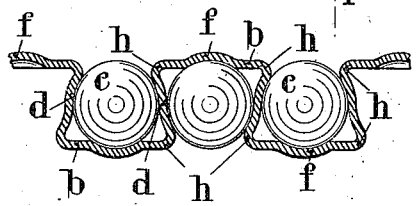
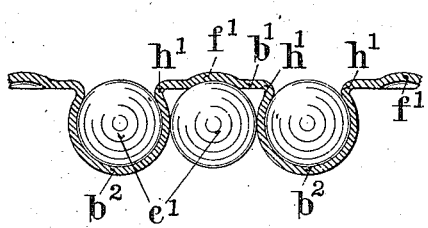
Witnesses
W. Wallace Nairn Jr.
Rosina T. Finotti
Inventor
Ernst Sachs
By Julius C. Dowell
his attorney

UNITED STATES PATENT OFFICE.

ERNST SACHS, OF SCHWEINFURT, GERMANY, ASSIGNOR TO THE BEARINGS COMPANY OF AMERICA, OF JERSEY CITY, NEW JERSEY, A CORPORATION OF NEW JERSEY.

BALL-BEARING WITH BALL-RETAINING DEVICE.

1,147,685.

Specification of Letters Patent.

Patented July 20, 1915.

Application filed June 29, 1912. Serial No. 706,740.

*To all whom it may concern:*

Be it known that I, ERNST SACHS, a subject of the King of Bavaria, residing at No. 23 Schultesstrasse, Schweinfurt, in Germany, have invented new and useful Improvements in Ball-Bearings with Ball-Retaining Devices, of which the following is a specification.

This invention relates to means for spacing and retaining the balls in an annular ball-bearing in which the balls run between concentric outer and inner rings and in confronting grooves thereof, the insertion of the balls in said grooves being facilitated by lateral recesses leading into the race-grooves.

The invention also relates to spacing means of thrust-bearings likewise composed of two race-rings placed the one oppositely to the other and having, or not having, grooves for the reception of the balls.

The spacing and retaining means more particularly consists of an undulated ring made of a flat strip of metal, or a ring stamped out from sheet-metal, the said spacing member being undulated or of sinuous shape by laterally bending it to and fro, so that, when placed in a bearing and filled with balls it passes alternately between the balls to the one and the other sides of the bearing; the pockets formed by the crimps located alternately on the opposite faces of the spacer-ring embrace the balls on their adjacent sides and on one outer side. Such devices are well known (and disclosed in the patents to Jackson L. Straub, No. 887,356, dated May 12, 1908, and Ernst Sachs, No. 888,266, dated May 19, 1908), but are defective in so far as special means are required to hold the balls against falling out of the retaining ring, when the bearing is decomposed or the filling apertures allow the easy escaping of the balls from the grooves.

The object of the invention is to provide a spacer ring of the said construction in which the balls are firmly and securely held and accurately guided in the middle of the track, in order to obtain perfect working of the bearing, at the same time facilitating the placing of the balls into the bearing. This object is attained by forming further bends or crimps in the spacer ring, and the characteristic feature of the spacer ring according to this invention resides in the provision of the said additional bends at the back or bottom of the ball-encircling pockets and in so disposing the said bends outwardly with respect to said pockets as to enlarge the rear part or bottoms of the pockets, thus facilitating the free movement and limited play of the balls therein, while forming projections which are directed into the mouth or open side or entry of the adjoining pockets located in the opposite face of the retaining ring, which pockets thereby are narrowed at their entry and so formed that they partly pass around the balls contained therein and prevent escaping of the same. The said bends being formed on the back of the single pockets, only a distance apart of the balls corresponding to the thickness of the sheet metal is required, as the crimps may loosely encircle the balls allowing them a very little play to minimize friction. On the other hand, the bends provided on the comparatively rigid back are not liable to be deformed, while not prejudicing the elasticity of the part located between, and spacing the balls from one another.

In the accompanying drawing which forms a part of this specification a ball-separating ring embodying the invention, is illustrated in two constructions.

Figure 1 is a transverse section of a ball bearing and of a spacer-ring constructed according to the present invention mounted therein, the section being taken on the line 1—1 of Fig. 2; Fig. 2 is a side elevation of the ball bearing and of the spacer-ring shown in Fig. 1; Fig. 3 is a transverse section of the spacer-ring on the line 3—3 of Fig. 2, shown in a developed form; and Fig. 4 is a similar section through another constructional form of the spacer-ring.

Similar reference characters denote similar parts throughout all figures of the drawing.

Referring to Figs. 1 to 3, the retaining device is substantially a flat ring of serpentine form and is passed through between the successive balls *c* alternately from one side to the other of the series of balls, so that it forms bends or pockets *b* which are open alternately on one face and the other of the ring. In the pockets formed by each of these bends or crimps *b* is held a ball *c*, which balls therefore have to be inserted some from one side and others from the other side. The parts of the serpentine bends which lie between the balls form separating walls *d*, against both sides of which the balls bear with just so much clearance as will enable them to rotate freely without any considerable amount of friction. The bends $b$ may also be provided in the middle of the bottoms of the pockets with depressions $f$ which fit part of the surface of the balls $c$ and partially embrace the latter while at the same time they contribute to the concentric guiding of the spacer-ring on the balls, which action, however, is principally secured by means of the walls $d$. On both sides of the depressions $f$ the bends $b$ are enlarged in opposite directions thereby forming curved projections $h$ which extend into the mouths of open portions or entries of the adjacent pockets, or oppositely directed bends $b$, and partially surround the respective balls which are thereby securely held in their pockets. The projections $h$ may be produced either previously to or after the insertion of the balls into their pockets; in the former case the balls must be forced in at the constricted or narrowed entry or mouth, for which purpose the spacer ring must possess a certain degree of elasticity. By the projections $h$ the walls $d$ themselves receive serpentine form and they are thereby caused to come into contact with the periphery of each ball at several points, which improves the guiding action. At the same time that part of the walls $d$ against which the balls bear on both sides has such a direction imparted to it that the pressure of the balls acts vertically upon the particular point of the said separating walls. For this reason the balls will not be forced to one side out of their proper position, as would be the case were the separating walls to be situated in an oblique position with respect thereto. This construction of the separating walls also enables the balls to be placed at a minimum distance from each other. The ball-spacing ring is preferably bent up out of a strip of metal or from a flat sheet metal ring, into the particular serpentine form, whereby the desired elasticity is obtained of itself.

The projections $h$ present the advantage to hold the balls securely in their proper position and location. This is of particular importance when the ball bearing in which the device is to be used is provided on one side only of the ball race with a lateral shoulder, or when the usual recesses $k$ (Fig. 2) in the lateral shoulders of the grooves are utilized for the introduction of the balls into the bearing.

The ball-spacing ring may be secured in a bearing in the following manner for example. One half of the balls is first introduced into the ball grooves and distributed over the periphery of the bearing after which the spacer-ring is pushed into the bearing and over the balls from the side, the latter passing into the pockets in the one face of the spacer-ring. When the projections $h$ are produced previously the balls snap into the bends owing to the elasticity of the ring. The remaining balls are then forced singly through the openings $k$ on the other side of the ball bearing into the race-grooves and at the same time into the bends on the other side of the spacer-ring. The projections $h$ on the respective side of the ring are preferably all or part of them produced after the introduction of the balls. It is then no longer possible for the balls to fall through the openings $k$, as they are securely held in the ball bearing by the projections $h$ on the spacer-ring.

In the modification shown in Fig. 4 only the bends $b^1$ on one side of the ball-spacing ring are provided with projections $h^1$, while those $b^2$ on the other side are of circular shape and consequently lie around the balls $c^1$ at the larger part of their periphery. This construction of the ball-spacing ring may be conveniently employed in a ball bearing which has the openings $k$ on one side only, while on the other side the shoulder is unbroken so that on this side it is not necessary to provide means for preventing the balls from falling out. The depressions $f^1$ may also, or may not be employed upon the bends $b^1$.

As hereinbefore disclosed, the invention can be embodied in various ways.

What I, therefore, claim as my invention, and desire to secure by Letters Patent, is:

1. A ball retaining and separating device consisting of a ring bent to form alternately on opposite sides thereof in close relation ball-receiving pockets having separating walls which extend from the bottom of the pocket on converging lines to form a constricted mouth, whereby a series of balls are confined in alinement and caused to travel in the same track.

2. A ball retaining and spacing device for ball bearings consisting of a metal plate bent to and fro so as to form alternately on opposite sides thereof in close relation ball-receiving pockets, the separating walls of each pocket extending on converging lines toward its mouth sufficiently around the ball inserted therein to retain such ball in such pocket when the device is removed from the bearings.

3. A ball retaining and separating device consisting of a substantially flat ring bent flatwise to and fro at an angle to the axis of rotation of the ball to form alternately on opposite sides thereof closely arranged ball-receiving pockets each having a constricted mouth adapted to prevent a ball therein from dropping out and enlarged toward its bottom, whereby the balls are confined in close relation and alined in a single annular series to cause them to travel in the same track.

4. A ball retaining and separating device comprising a substantially flat ring bent to form alternately on opposite sides thereof in close relation ball-receiving pockets with separating walls each extending from the bottom of the pocket toward its mouth at an angle to the axis of the ring, thereby forming a constricted mouth, whereby the balls are confined in close relation in a single annular series and alined to travel in the same track.

5. A ball retaining and separating device comprising a substantially flat ring bent to form alternately on opposite sides thereof closely arranged ball-receiving pockets with separating walls disposed at an angle to the axis of the ring, each wall having a bend to provide a ball seat or contact point at each side thereof and said walls being shaped to provide a pocket enlarging toward its bottom and having a constricted mouth, whereby the balls are confined in close relation and alined so as to travel in the same track.

6. A spacer for ball bearings consisting of a ring bent to form alternate oppositely-opening ball-receiving pockets, each pocket of the ring being adapted to sufficiently surround a ball inserted therein to retain such ball in such pocket, each pocket being approximately angular in contour to contact with the ball at several separated points and having an outwardly projecting bend in its bottom, and outwardly projecting minor bends projecting into and constricting the mouths of the adjacent pockets.

7. A ball retaining and separating device comprising an annulus bent laterally to and fro in serpentine form so as to provide a series of pockets arranged in close relation and opening alternately on opposite sides thereof, the bottoms of the pockets at each side of the ring being arranged in substantially the same plane, and said pockets being separated one from another by a wall which extends from the bottom of the pocket so as to gradually approach the confronting wall and provide a constricted mouth.

8. A ball retaining and separating device comprising a ring-shaped body having a series of pockets opening alternately on opposite sides of the ring and separated one from another by a wall which gradually approaches the opposite wall so as to form a constricted mouth, said pockets enlarging toward their bottoms and having angular bends at opposite sides of the bottom which project and constrict the mouth of the pocket so as to prevent egress of the ball.

In testimony whereof I have signed my name to this specification in the presence of two subscribing witnesses.

ERNST SACHS.

Witnesses:
HENRY HASPER,
WOLDEMAR HAUPT.